US011559775B2

(12) United States Patent
Zahirovic et al.

(10) Patent No.: US 11,559,775 B2
(45) Date of Patent: Jan. 24, 2023

(54) EQUAL FLOW SCALE CATCHER

(71) Applicant: Catmasters LLC, Pasadena, TX (US)

(72) Inventors: Emir Zahirovic, Pasadena, TX (US); Marc Rogato, Houston, TX (US)

(73) Assignee: CATMASTERS LLC, Pasadena, TX (US)

( * ) Notice: Subject to any disclaimer, the term of this patent is extended or adjusted under 35 U.S.C. 154(b) by 0 days.

(21) Appl. No.: 17/475,939

(22) Filed: Sep. 15, 2021

(65) Prior Publication Data
US 2022/0219131 A1   Jul. 14, 2022

Related U.S. Application Data

(60) Provisional application No. 63/052,339, filed on Jul. 15, 2020.

(51) Int. Cl.
 *B01J 4/00* (2006.01)
 *B01J 8/00* (2006.01)
 (Continued)

(52) U.S. Cl.
 CPC .......... *B01J 8/0085* (2013.01); *B01J 8/0278* (2013.01); *B01J 2219/00247* (2013.01)

(58) Field of Classification Search
 CPC ..... B01J 4/00; B01J 4/001; B01J 4/008; B01J 8/00; B01J 8/005; B01J 8/008; B01J 8/0085; B01J 8/02; B01J 8/0278; B01J 8/08; B01J 8/085; B01J 19/00; B01J 19/24; B01J 2219/00; B01J 2219/00049; B01J 2219/000245; B01J 2219/00247
 See application file for complete search history.

(56) References Cited

U.S. PATENT DOCUMENTS

| 3,996,015 A | 12/1976 | Hutchings |
| 10,150,092 B2 | 12/2018 | Zahirovic |
| 2017/0341047 A1 | 11/2017 | Zahirovic |

FOREIGN PATENT DOCUMENTS

| CN | 201493096 U | 6/2010 | |
| WO | WO-2019126432 A1 * | 6/2019 | ............. B01D 17/02 |

OTHER PUBLICATIONS

Ji et al. (CN 104275127 A) published on Jan. 14, 2015 with machine translation (Year: 2015).*

(Continued)

*Primary Examiner* — Natasha E Young

(57) ABSTRACT

An equal flow scale catcher device, or EFSC, is designed based on a unique scale catching technology for a reactor. With multiple scale catching modules, the EFSC offers equal flows to a catalyst bed or distribution tray of the reactor, independent of each module's degree of saturation with particles of an incoming fluid during operation. Thus, the innovative EFSC system achieves substantial uniformity of fluid delivery across the distribution tray of the reactor and the static pressure field above the liquid level on the distribution tray. Further, the EFSC effectively captures solid particles in the incoming fluid to the reactor and solid particles that form at the top head of the reactor. The EFSC employs a modular structure that allows optimal configuration of the scale catching modules and scale catching units inside each scale catching module, thus efficiently facilitating simple and efficient installation, maintenance, and/or replacement of the EFSC.

20 Claims, 16 Drawing Sheets

(51) Int. Cl.
*B01J 8/02* (2006.01)
*B01J 8/08* (2006.01)
*B01J 19/00* (2006.01)
*B01J 19/24* (2006.01)

(56) References Cited

OTHER PUBLICATIONS

Scale catcher, Haldor Topsoe (https://www.topsoe.com/products/equipment/scale-catcher).

* cited by examiner

EQUAL FLOW SCALE CATCHER

The current application claims a priority to the U.S. Provisional Patent application Ser. No. 63/052,339 filed on Jul. 15, 2020.

FIELD OF THE INVENTION

The present invention generally relates to filtering devices. More specifically, the present invention relates to a scale catching device designed to provide an innovative modular structure that facilitates equal flows and substantially efficient filtration of fluids to chemical reactors.

BACKGROUND OF THE INVENTION

A device for filtration of reactors is in demand. During hydroprocessing, pressure drop over a fixed catalyst bed can intensify for various reasons, including polymerization, coking, and plugging of the catalyst bed with various particles and compounds brought to the reactor by the inlet streams (gas and/or liquid).

The reasons for reactor shutdown can be various, but beyond deactivation of the catalyst, buildup of pressure drop over catalytic beds is the most common.

Because all reactors have a maximum allowable pressure drop, with operational costs (energy consumption) increasing if operated under increased pressure drop, the unit of which a reactor is a part must be shut down for complete or partial change of the catalyst loaded in that reactor.

The industry has developed various technologies for protecting the active catalyst in the reactor. Catalyst grading and different high-void and porous materials that can store particles before reaching the catalyst have been introduced to the market and are used widely, but they have limitations. For example, such materials are loaded into the "reactor active space," so the quantity of main/bulk catalyst must be reduced to leave space for grading. What's more, it has never been positively shown that all grading is used. As larger materials are loaded atop smaller ones, the layers of the catalyst act as a serial sieve, with separation of particle sizes taking place at the interfaces between those layers.

Many leading technology licensors (Shell©, Topsoe©, UOP©) offer proprietary scale catching technology that is used in many hydroprocessing reactors globally. Even so, there is a need to develop a device to solve the aforementioned problems.

The present invention is intended to address problems associated with and/or otherwise improve on conventional devices through an innovative scale capture device that is designed to provide a convenient means of installing and capturing solid particles that enter a reactor while incorporating other problem-solving features.

SUMMARY OF THE INVENTION

The present invention provides an equal flow scale catcher device, or EFSC. The EFSC is designed based on a unique scale catching technology to a reactor. With multiple scale catching modules, the EFSC of the present invention offers equal flows to a catalyst bed and/or a distribution tray of the reactor, independent of each module's degree of saturation with particles of an incoming fluid. Thus, the innovative EFSC system provides a significant improvement to existing technologies and achieves substantial uniformity of fluid delivery across the distribution tray of the reactor and the static pressure field above the liquid level on the distribution tray, which are the most critical parameters in an efficient tray performance.

Further, the EFSC of the present invention can efficiently and effectively capture solid particles of any type that enter the reactor in the incoming fluid as well as solid particles that form at the top head of the reactor, and prevent them from reaching the active catalyst in a catalyst bed inside the reactor and grading layers installed in the active space of the reactor. The EFSC of the present invention employs a modular structure that allows optimal configuration of the present invention inside the reactor with the desired number of scale catching modules and optimal number of scale catching units inside each scale catching module, thus efficiently facilitating simple and efficient installation, uninstallation, loading, and unloading of the present invention.

DETAIL DESCRIPTIONS OF THE INVENTION

Figure 1:
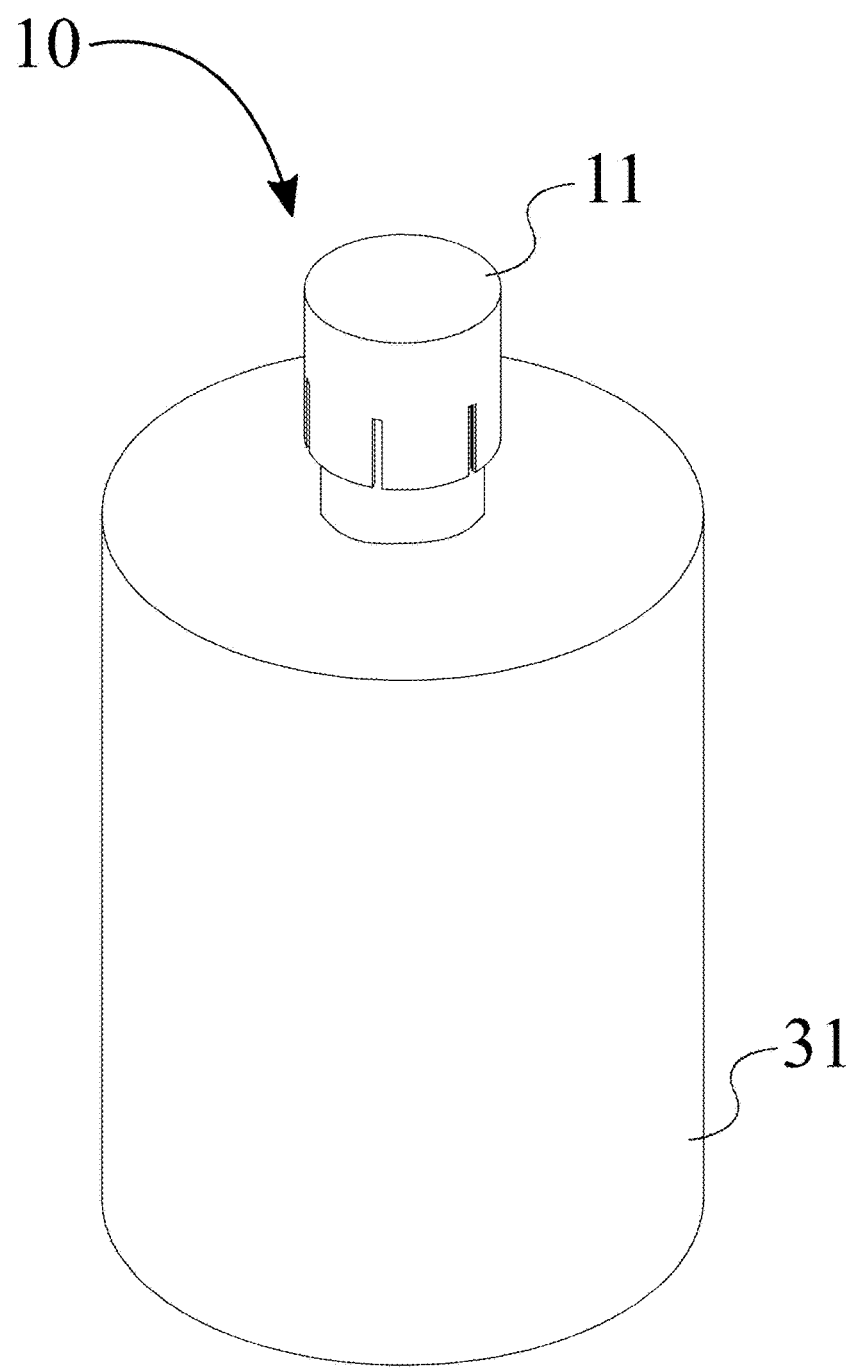
FIG. 1 is an isometric perspective view of a scale catching module of the present invention.
Figure 2:
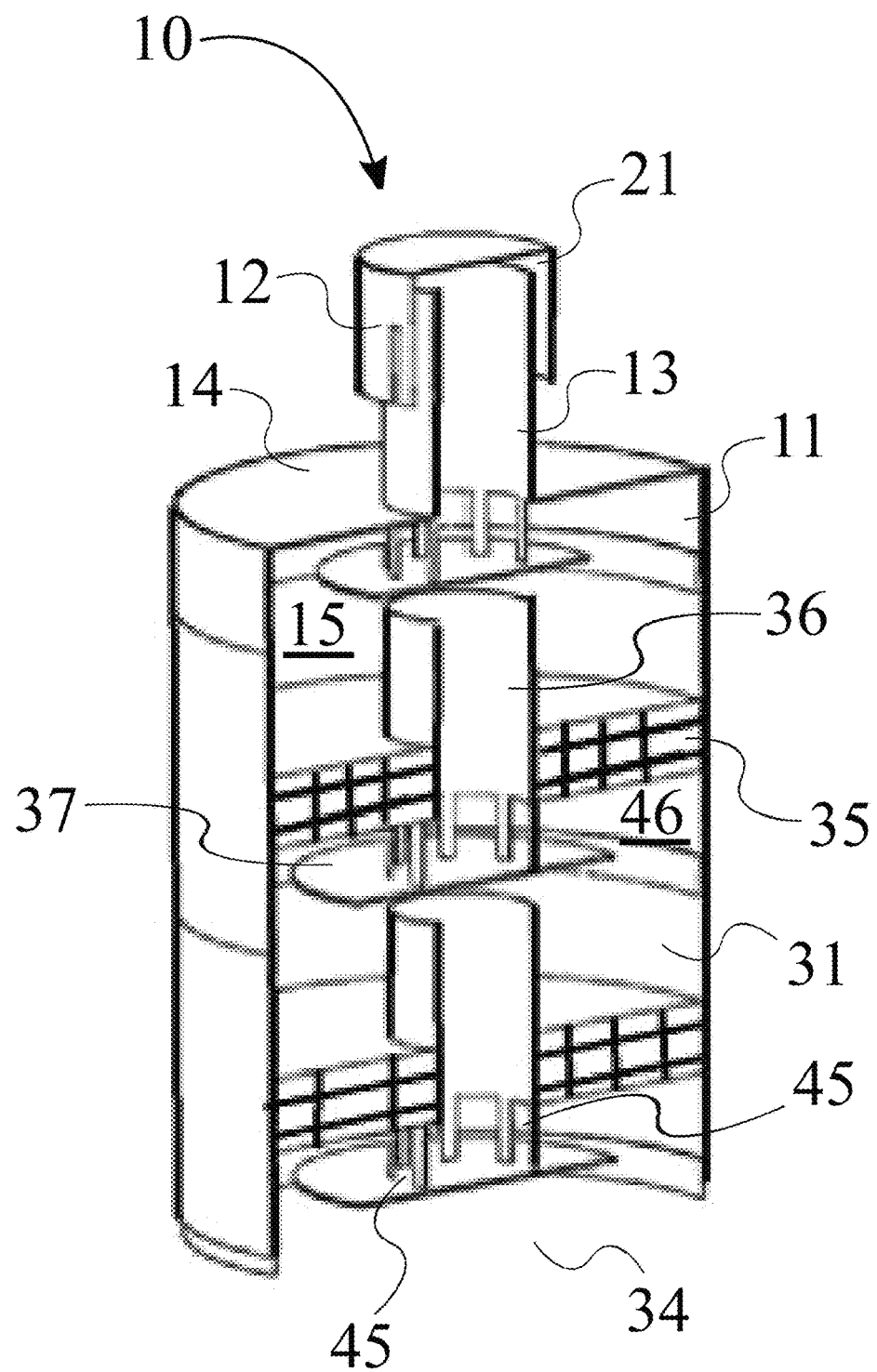
FIG. 2 is a cross-sectional view of one embodiment the present invention, wherein two scale catching units are included in a scale catching module.

All illustrations of the drawings are for the purpose of describing selected versions of the present invention and are not intended to limit the scope of the present invention.

The present invention, which is called an Equal Flow Scale Catcher, or EFSC, provides a scale catching technology to a reactor, which facilitates equal flows through all scale catching modules, independent of each module's degree of saturation with particles. Thus, the EFSC of the present invention offers an innovative system that offers a significant improvement to existing technologies and achieves substantial uniformity of fluid delivery across the distribution tray of the reactor and the static pressure field above the liquid level on the distribution tray, which are the most critical parameters in an efficient tray performance. Further, the EFSC of the present invention can efficiently and effectively capture solid particles of any type that enter the reactor in the fluid, which may include, but is not limited to, liquid and/or gas, air, or any combination thereof, etc., as well as solid particles that form at the top head of the reactor, and prevent them from reaching the active catalyst in a catalyst bed inside the reactor and grading layers installed in the active space of the reactor. The EFSC of present invention employs a modular structure that allows optimal configuration of the present invention inside the reactor with the desired number of scale catching modules and optimal number of scale catching units inside each scale catching module, thus efficiently facilitating simple and efficient installation, uninstallation, loading, and unloading of the present invention.

As can be seen in FIG. 1 to FIG. 16, the EFSC of the present invention comprises a modular scale catcher for providing equal flow of filtered fluids to the catalyst bed inside a reactor and provides a scale capture device to the reactor before the incoming fluid reaches the catalyst bed and/or distribution tray. As can be seen in FIG. 1 to FIG. 4, the EFSC comprises at least one scale catching module 10, a base plate 50, and the reactor 90, which includes the catalyst bed 91, and/or distribution tray 92.

As can be seen in FIG. 1 to FIG. 12, each of the at least one scale catching module 10 comprises a cap 11 and at least one scale catching unit 31. The cap 11 can be installed at the top of the scale catching module 10, configured in such a way that the cap 11 can bring gas and liquid into interaction and bring both, in the same amount and ratio, to each of the scale catching modules 10. The cap 11 comprises a cover 12, an inlet tube 13, a body 14, a cap cavity 15, a cap wall 16, a cap face 17, an opening 18, an inlet plate 19, and an inlet gap 21. The inlet tube 13 is positioned on the body 14 opposite the opening 18. The cover 12 is exteriorly attached to the inlet tube 13 opposite the opening 18. The inlet gap 21 is positioned between the cover 12 and the inlet tube 13 to allow the incoming fluid to enter the inlet tube 13 of the scale catching module 10. The cap cavity 15 is interiorly positioned in the body 14 with the cap wall 16 being exteriorly positioned on the body 14. The cap face 17 is positioned on the body 14 opposite the opening 18. The inlet tube 13 is positioned on the cap face 17 and extending into the cap cavity 15.

Figure 6:
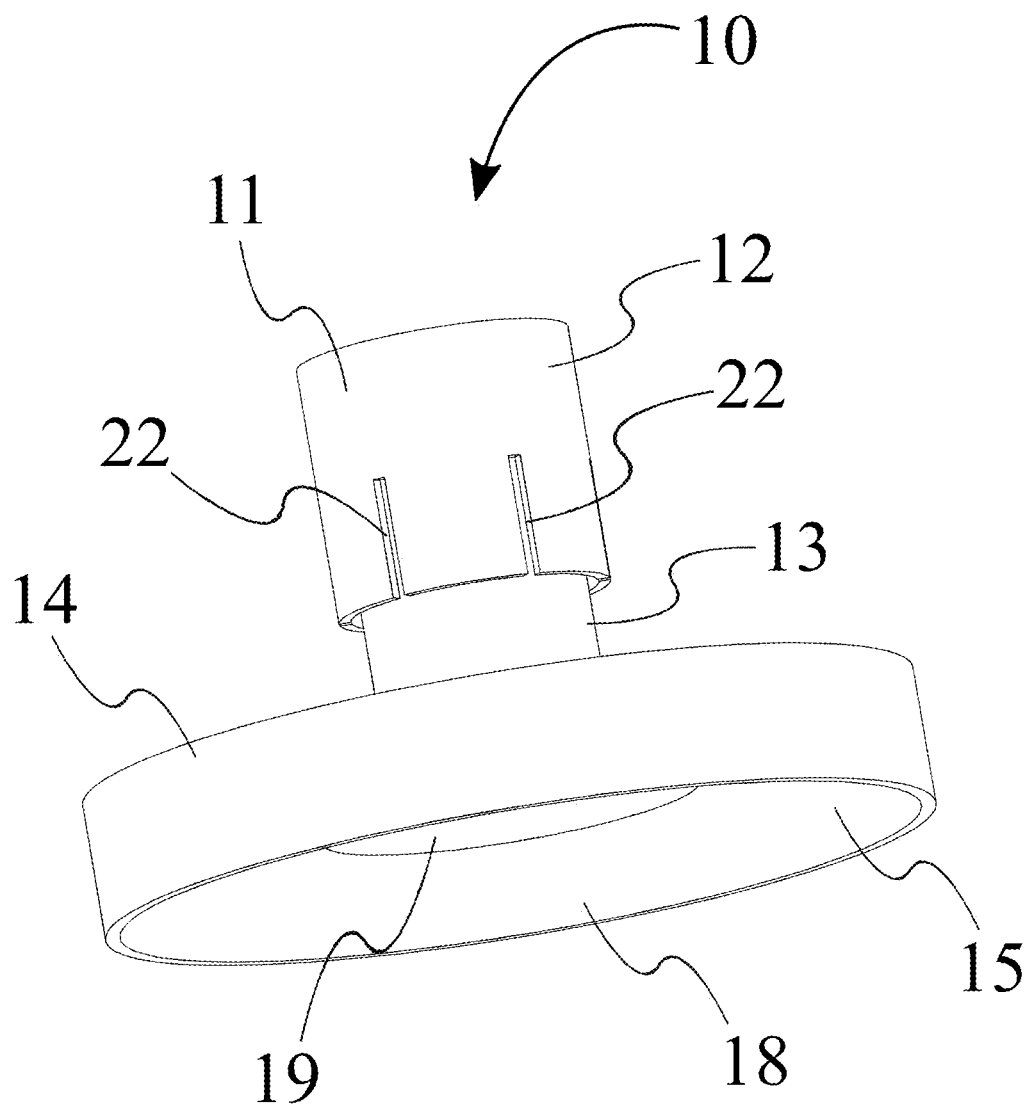
FIG. 6 is a perspective view of a cap of the scale caching module of the present invention.
Figure 7:
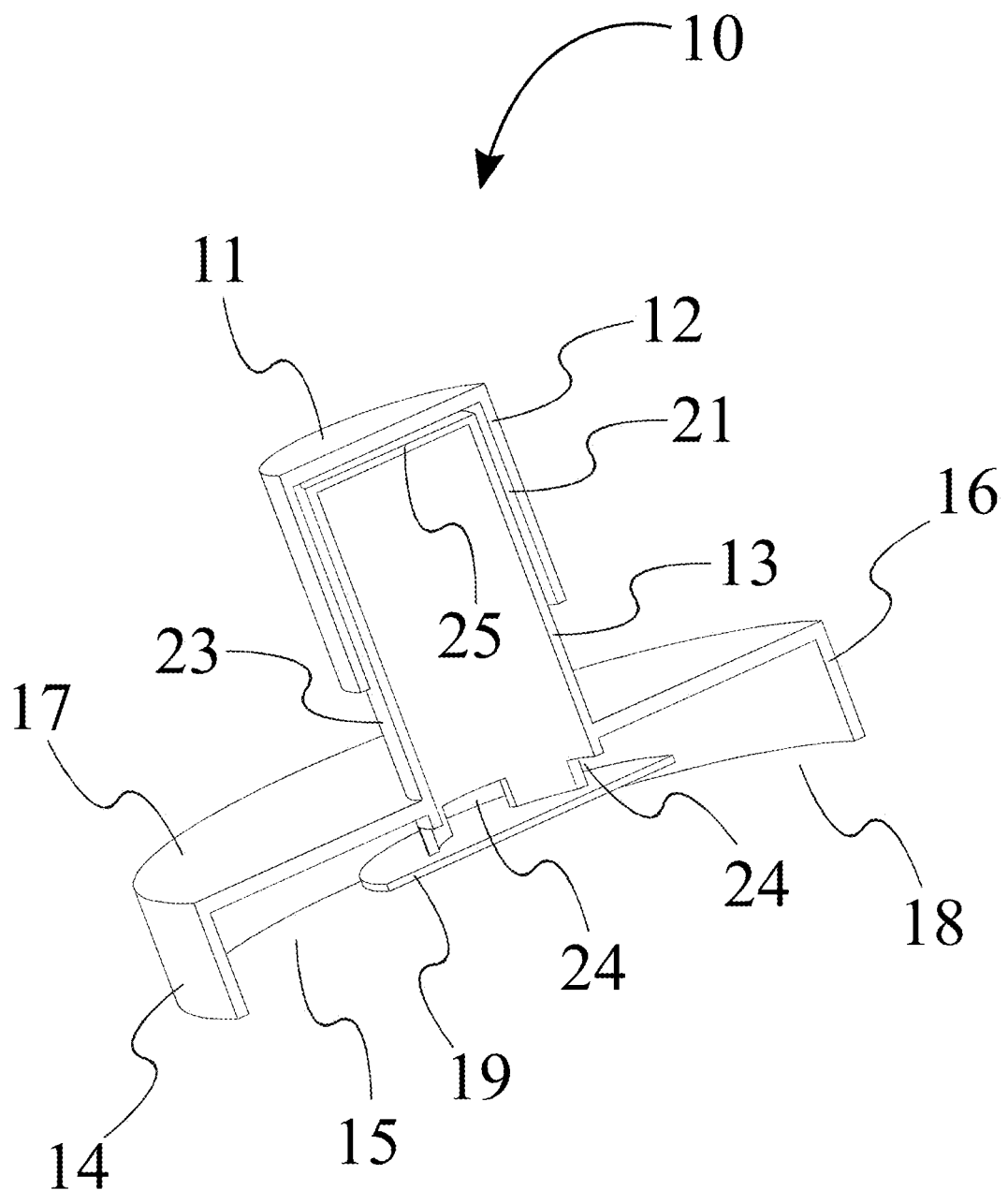
FIG. 7 is a cross-sectional view of the cap of the scale caching module of the present invention.

As can be seen in FIG. 6 and FIG. 7, the inlet tube 13 comprises an inlet tube wall 23, a plurality of wall apertures 24, and an inlet port 25. More specifically, the inlet port 25 is terminally positioned on the inlet tube 13 adjacent the cover 12. The cover 12 prevents the incoming fluid from directly entering the inlet tube 13 while allows the incoming fluid to enter through the inlet gap 21 between the inlet tube 13 and the cover 12. The cover 12 is positioned adjacent the inlet port 25 of the inlet tube 13. Additionally, the cover 12 comprises a plurality of cover slots 22. The plurality of cover slots 22 is positioned on the cover 12 opposite the inlet port 25 of the inlet tube 13 and allows the incoming fluid to pass through and entering the inlet gap 21. Further, the plurality of wall apertures 24 is distally positioned on the inlet tube wall 23 opposite the inlet port 25 and provides fluid exit from the inlet tube 13. The inlet plate 19 is terminally attached to the inlet tube 13 adjacent the plurality of inlet wall apertures 24 so that the inlet plate 19 fully covers the exit of the inlet tube 13. Additionally, the inlet plate 19 is positioned inside the cap cavity 15 adjacent the opening 18. The inlet plate 19 functions as an impingement plate, which may include, but is not limited to a size that is larger than that of the inlet tube 13 so that the fluid flows out of the inlet tube 13 through the plurality of intel wall apertures 24. The purpose of the inlet plate 19 is to reduce the momentum and change the direction of the exiting fluids, minimizing the impact of the discharge stream on the components placed below or on the levelness of the liquid surface of the distributor tray 92, which may be placed below the present invention.

Figure 8:
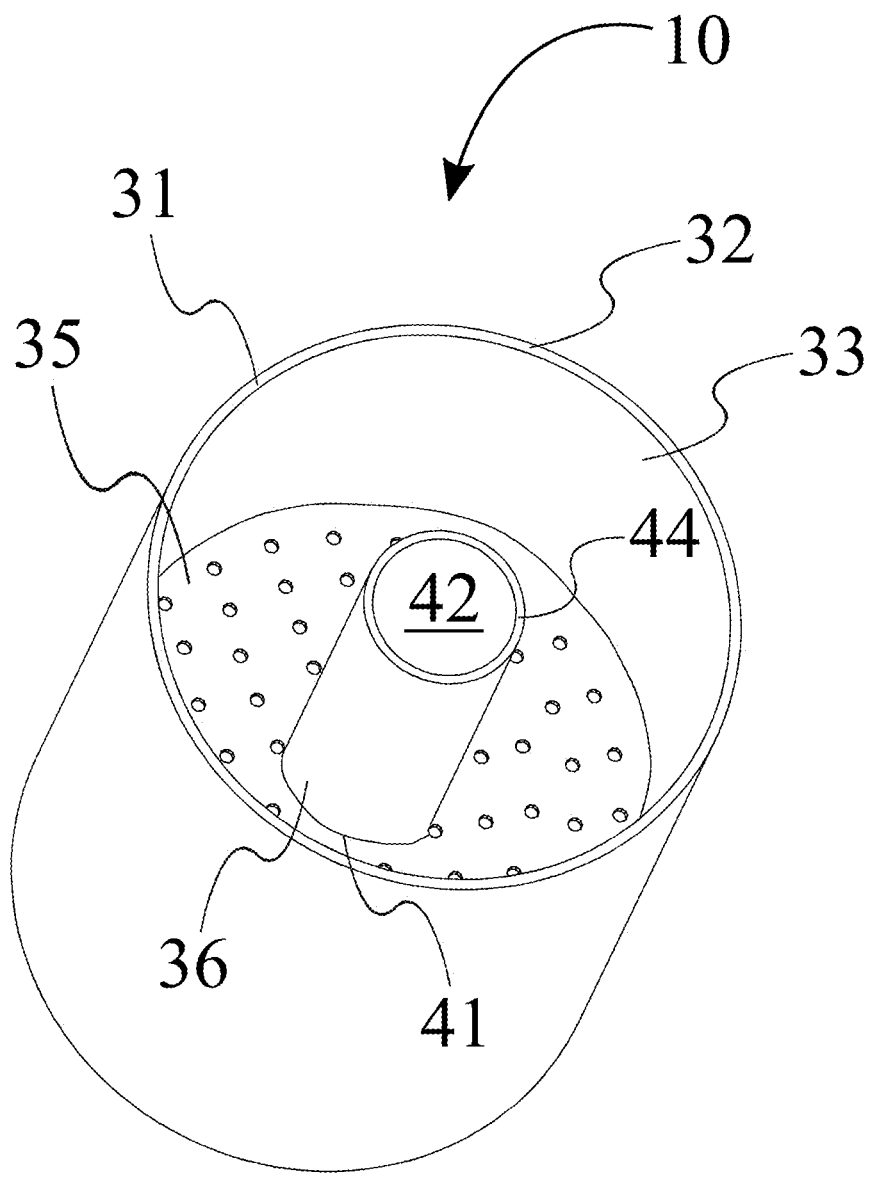
FIG. 8 is a top view of a scale catching unit of the scale caching module of the present invention.
Figure 9:
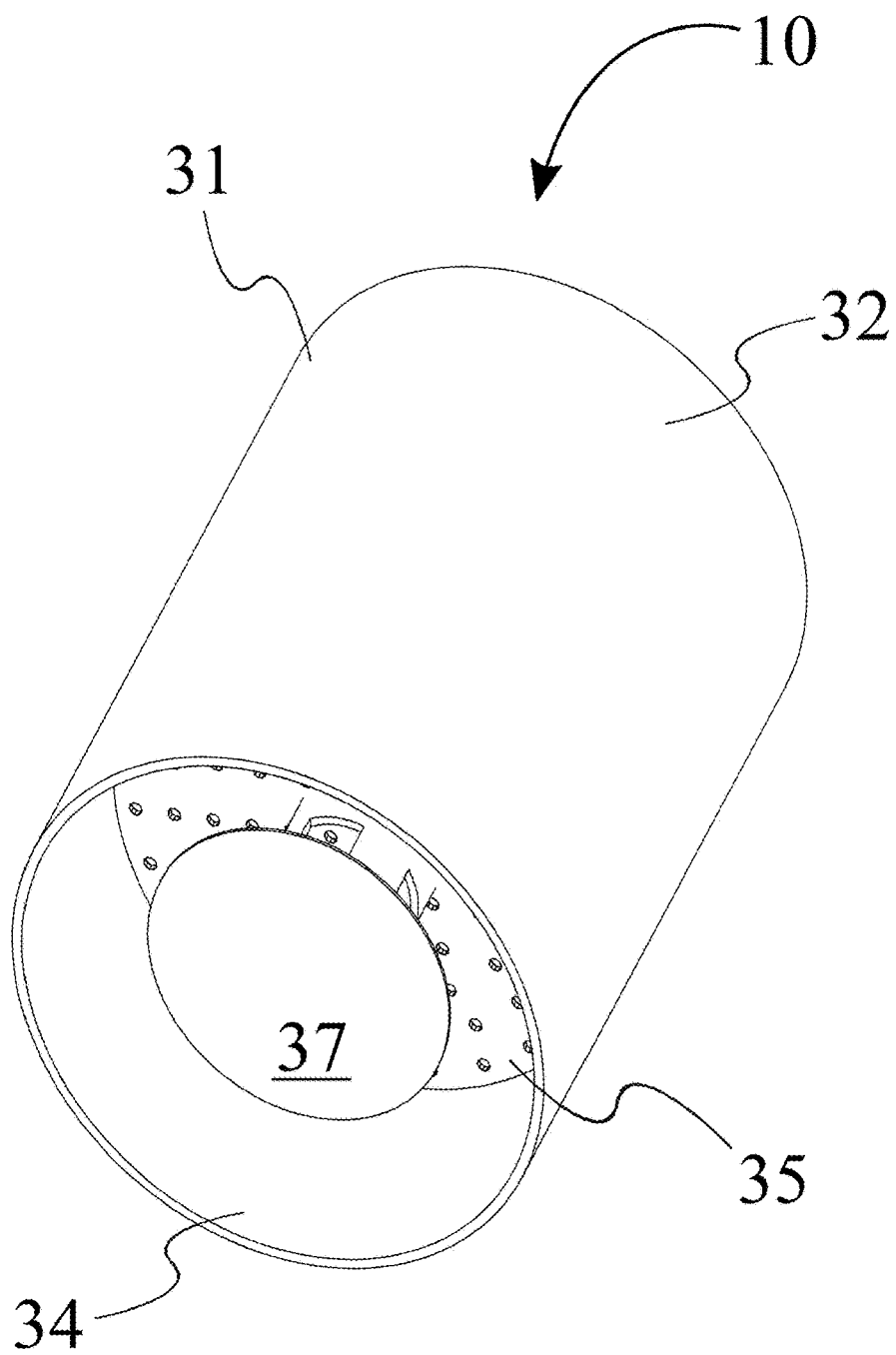
FIG. 9 is a bottom view of the scale catching unit of the scale caching module of the present invention.
Figure 10:
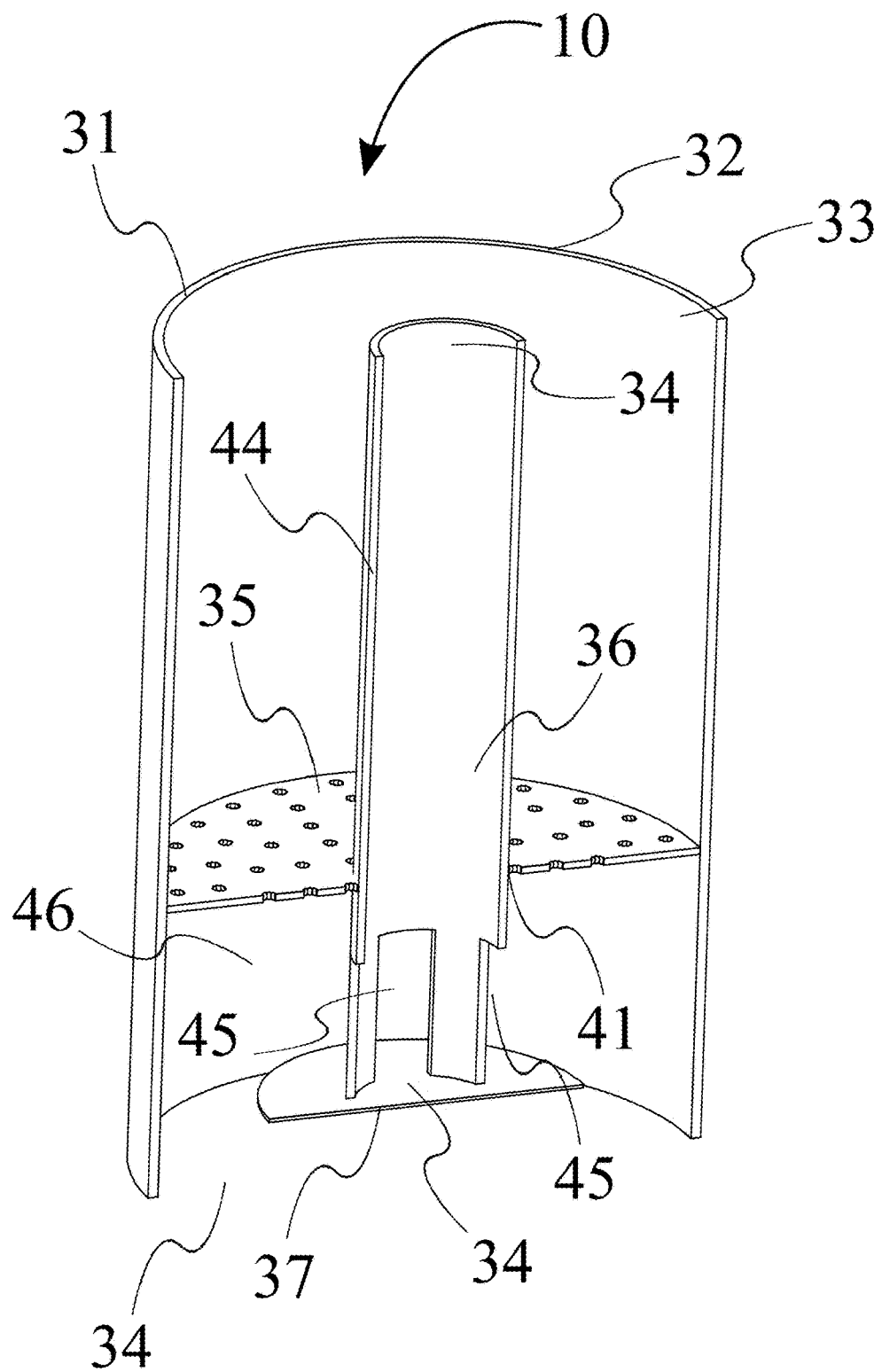
FIG. 10 is a cross-sectional view of the scale catching unit of the scale caching module of the present invention.

As can be seen in FIG. 8 to FIG. 10, the scale catching unit 31 comprises a unit body 32, a unit inlet 33, a unit outlet 34, a scale catching bed 35, a transfer tube 36, and an impingement plate 37. More specifically, the unit inlet 33 is terminally positioned on the unit body 32, which may include, but is not limited to, a tube, a channel, etc. The unit outlet 34 is terminally positioned on the unit body 32 opposite the unit inlet 33. The scale catching bed 35 is interiorly and peripherally attached to the unit body 32. The transfer tube 36 is attached to the scale catching bed 35 through insertion thereof so that the fluid is allowed to pass through either the transfer tube 36 or the scale catching bed 35. In some embodiments of the present invention, the scale catching bed 35 comprises a bed aperture 41, which traverses through the scale catching bed 35. The transfer tube 36 is adapted to the bed aperture 41. Additionally, the transfer tube 36 comprises a transfer tube inlet 42, a transfer tube outlet 43, a transfer wall 44, a plurality of wall apertures 45, and a catching bed gap 46. The transfer tube inlet 42 is terminally positioned on the transfer tube 36 adjacent the unit inlet 33. The transfer outlet 43 is terminally positioned on the transfer tube 36 opposite the transfer tube inlet 42. The plurality of wall apertures 45 is peripherally distributed on the transfer wall 44 adjacent the transfer tube outlet 43 and the plurality of wall apertures 45 is interiorly positioned in the unit body 32 and adjacent the scale catching bed 35. The impingement plate 37 is terminally attached to the transfer tube 36 and is interiorly positioned in the unit body 32 adjacent the unit outlet 34. Additionally, the impingement plate 37 may include, but is not limited to, a size that is larger than that of the transfer tube 36 so that the fluid inside the transfer tube 36 only exits through the plurality of the wall apertures 45. As can be seen in FIG. 10, the catching bed gap 46 is positioned between the scale catching bed 35 and the impingement plate 37. The impingement plate 37 can reduce the momentum and change the direction of the exiting fluids, minimizing the impact of the discharge stream on the components placed below or on the levelness of the liquid surface of the distributor tray 92, which may be placed below the present invention, or the next scale catching unit 31. The catching bed gap 46 allows the fluid coming out of the transfer tube 36 to flow through the plurality of wall apertures 45 and exit the unit outlet onto the catalyst bed 91 or the distribution tray 92 of the reactor 90. In some embodiments, the scale catching module 10 together with the base plate 50 can be installed directly above the catalyst 91 and thus, the scale catching module 10 and the base plate 50 have a function of a distributor tray. Further, as can be seen in FIG. 2, and FIG. 13 to FIG. 16, the cap 11 is attached to the scale catching unit 31 through the opening 18 of the cap 11 being adapted to the unit inlet 33 of the scale catching unit 31. In some embodiments, the transfer tube 36, the impingement plate 37, and the unit body 32 can be configured in such a way that a scale catching unit 31 can be placed atop another scale catching unit 31, allowing multiple scale catching units 31 to be stacked, as shown in FIG. 2, and FIG. 13 to FIG. 16.

Figure 3:
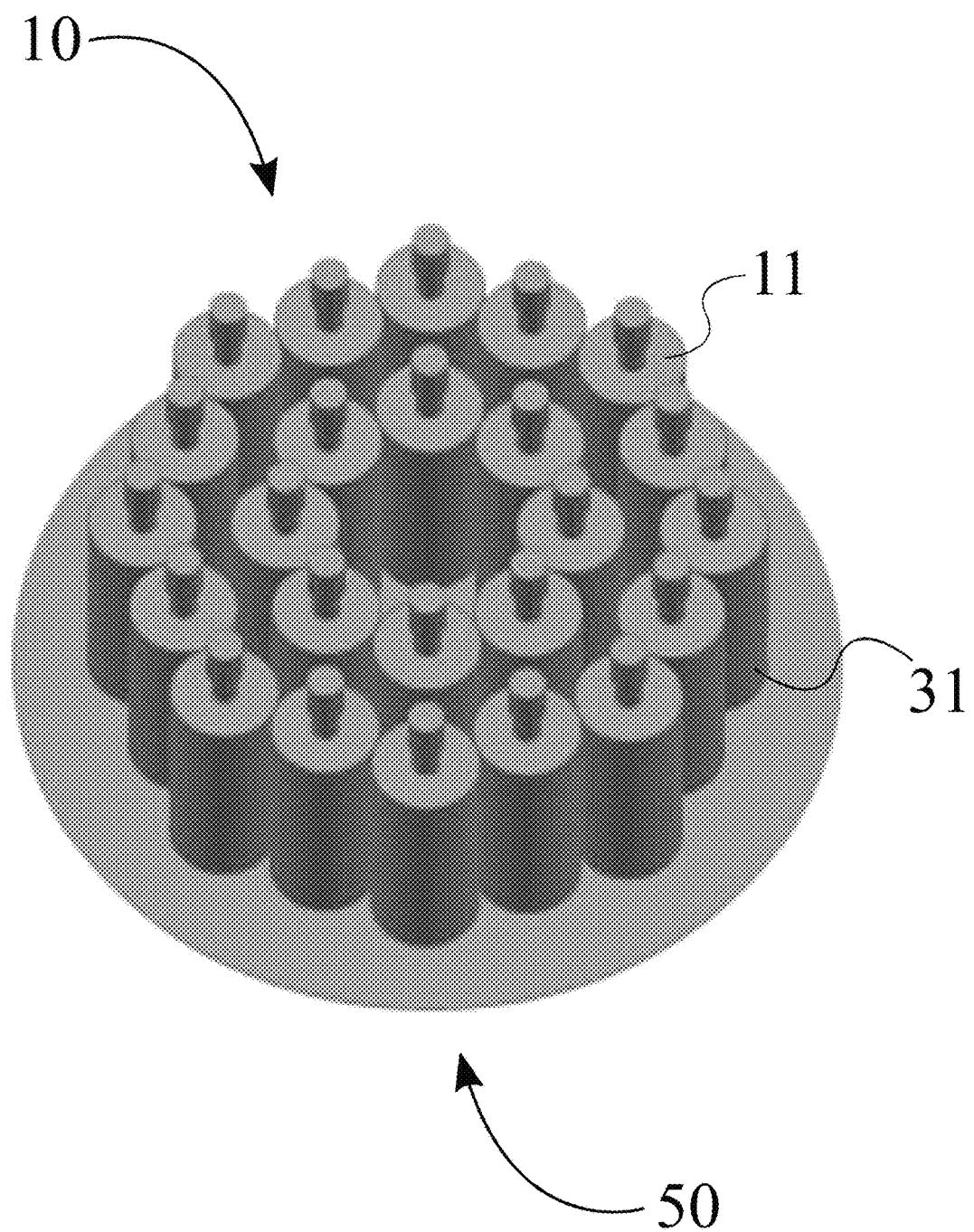
FIG. 3 is top view of an alternative embodiment of the present invention, where a plurality of scale catching modules are attached to a base plate.
Figure 4:
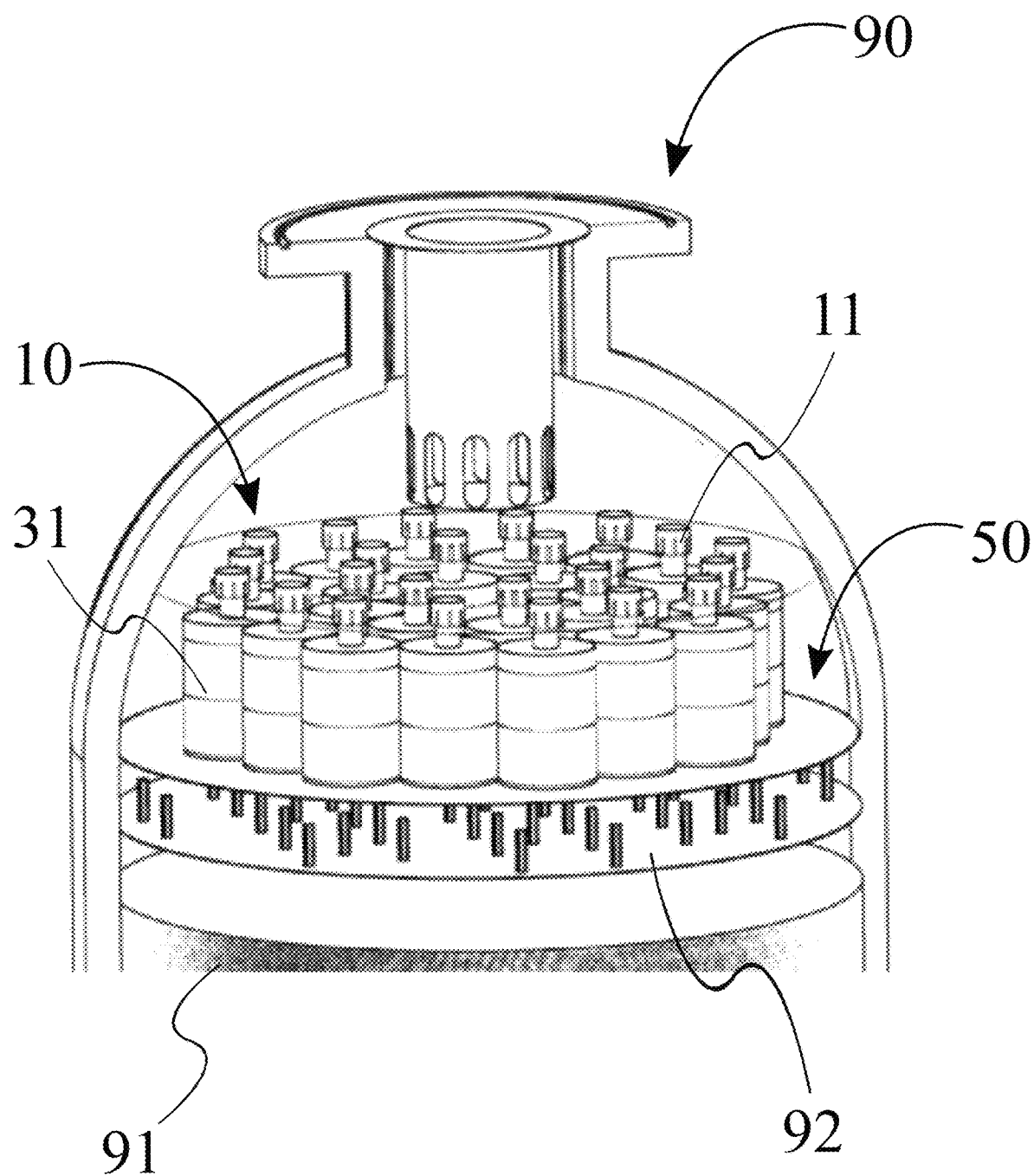
FIG. 4 is a front view of the present invention, wherein the present invention is interiorly mounted to a distribution tray which is stacked onto a catalyst bed.
Figure 5:
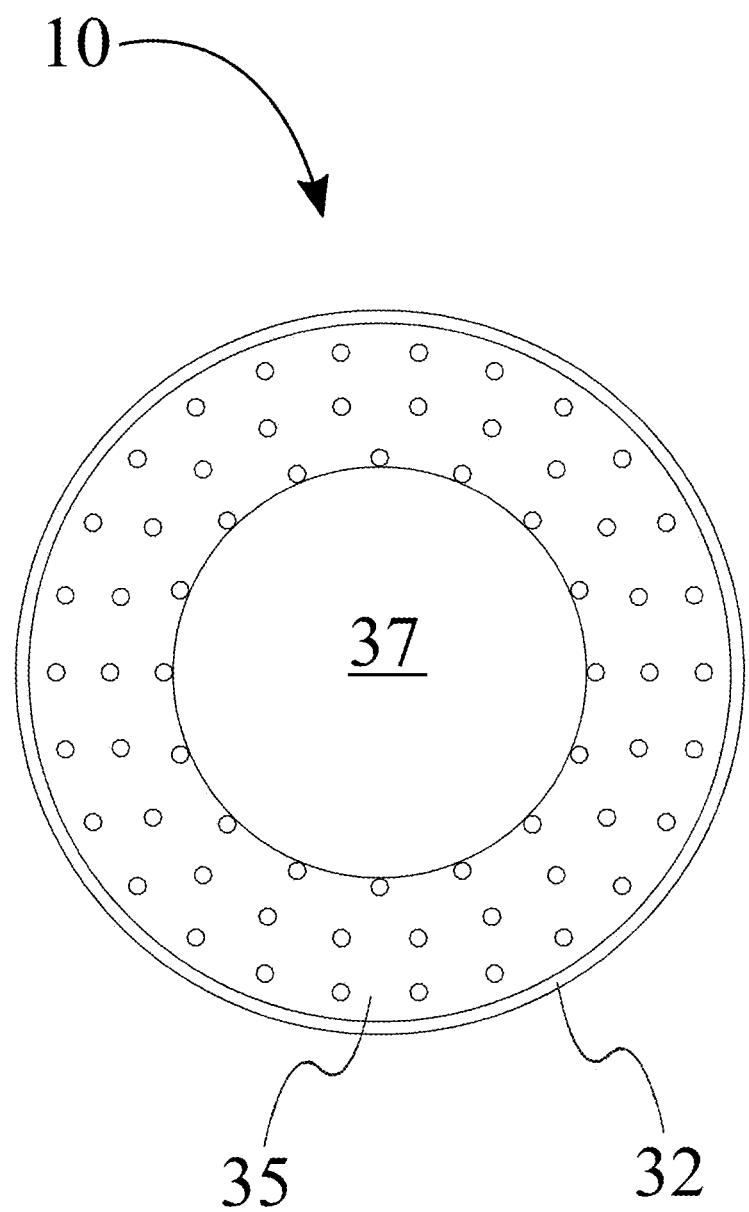
FIG. 5 is a bottom view of the scale catching module of the present invention.
Figure 12:
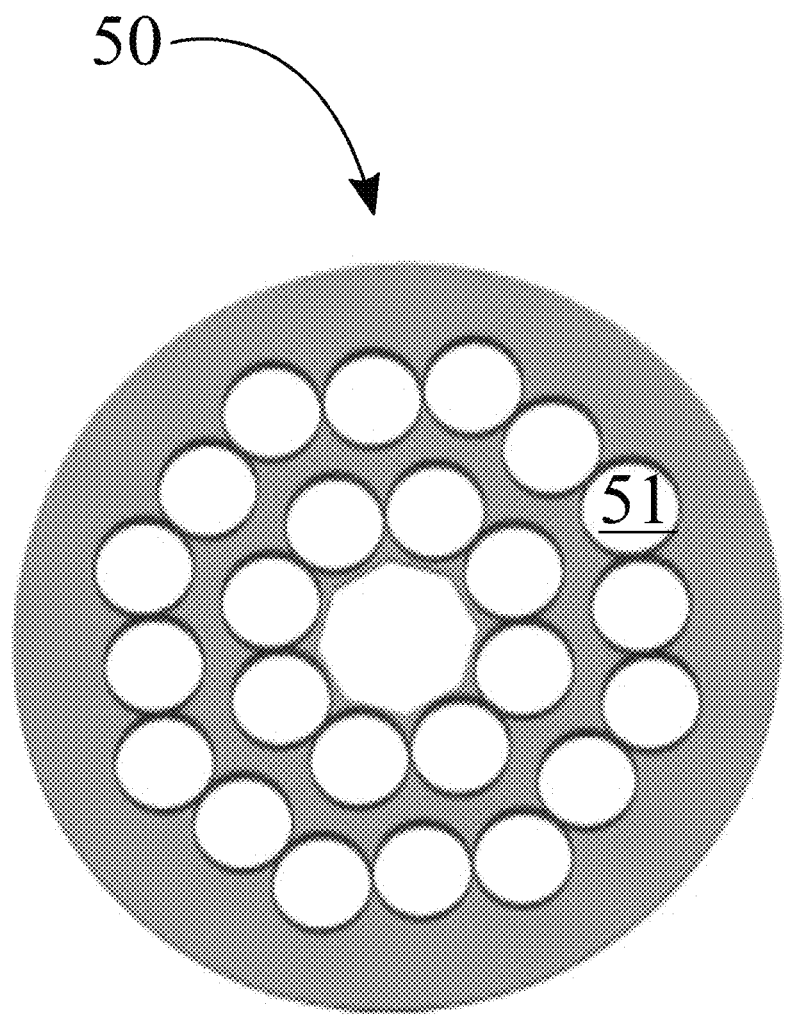
FIG. 12 is a top view of one embodiment of the base plate of the present invention, wherein the base plate includes at least one hole.

As can be seen in FIG. 3 and FIG. 12, the base plate 50 comprises at least one hole 51. Further, each scale catching module 10 is attached to the base plate 50 with the unit outlet 34 of the scale catching unit 31 being mounted to the corresponding hole 51 of the base plate 50, and the base plate 50 is detachably and interiorly mounted to the reactor 90 with the base plate 50 being parallel with and adjacent the catalyst bed 91. The base plate 50 can be configured in such a way that the scale catching modules 10 can be installed and can provide discharge ports for discharging filtered effluents (liquid and gas of the incoming fluids). In some embodiments, as shown in FIG. 12, the base plate 50 can include a plurality of holes 51 to provide an attachment mechanism for the scale catching modules 10. For example, the base plate 50 can include a plurality of holes 51 in various shapes that match the shape of the scale catching modules 10, so that the scale catching modules 10 can be inserted into the holes 51 and secured to the base plate 50, as shown in FIG. 3. In some embodiments, the holes 51 of the base plate 50 may provide evenly distributed discharge ports to ensure that the effluents (gas and/or liquid) are delivered uniformly, and at low vertical velocity, to the section below the base plate 50.

Figure 11:
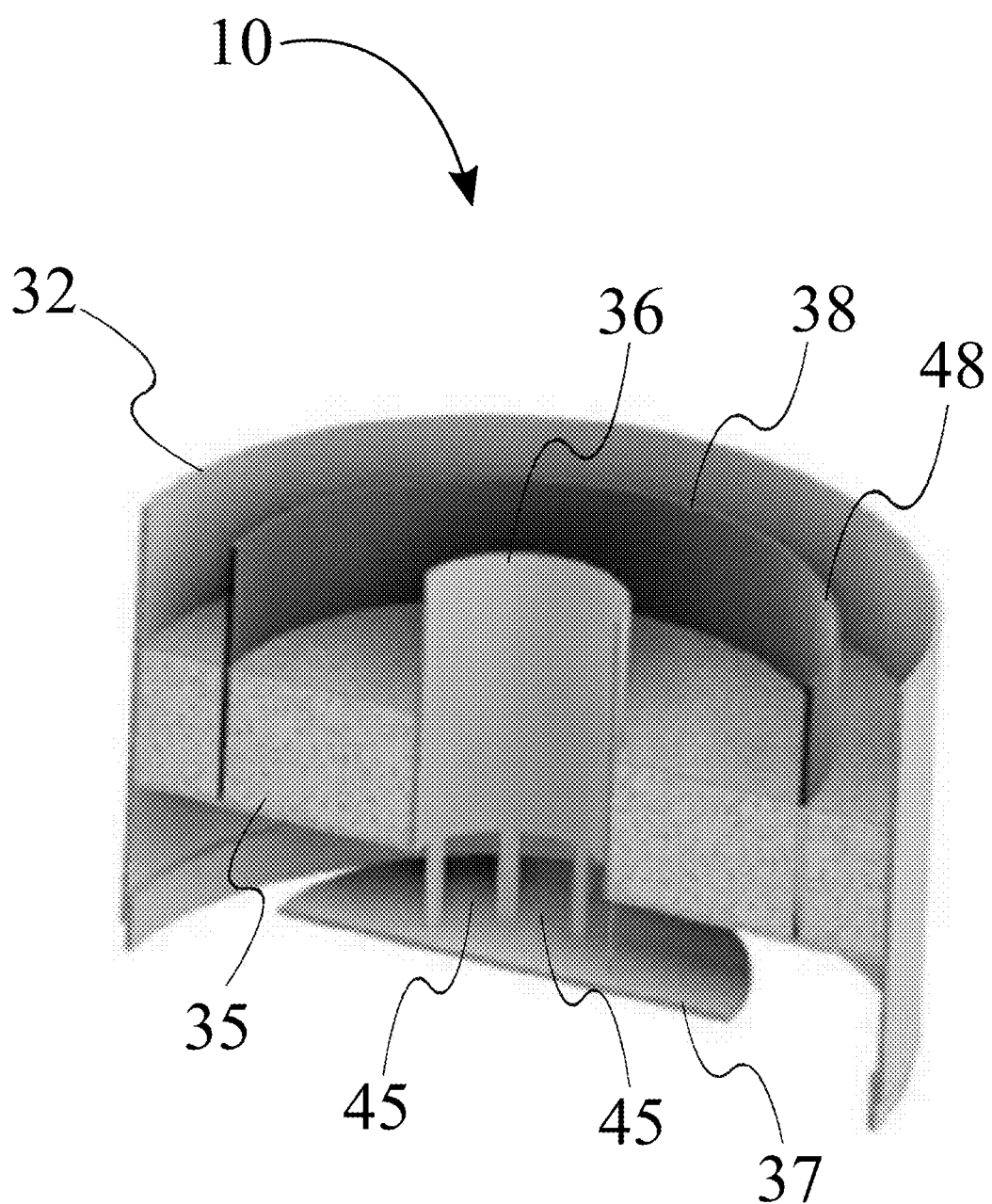
FIG. 11 is a cross-sectional view of an alternative embodiment of the scale catching unit of the scale caching module of the present invention, wherein a separation wall is inserted into a scale catching bed that is interiorly mounted to the body of the scale catching unit.

As can be seen in FIG. 11, in some embodiments of the present invention, the scale catching unit 31 further comprises a separation wall 38. More specifically, the separation wall 38 is attached to the scale catching bed 34 by insertion. The separation wall 38 comprises an inlet edge 48, which is terminally positioned on the separation wall 38 opposite the scale catching bed 35, and the separation wall 48 is interiorly positioned in the unit body 32 adjacent the unit inlet 33.

As can be seen in FIG. 2, FIG. 5, FIG. 8 to FIG. 11, and FIG. 12 to FIG. 16, the scale catching bed 35 of the scale catching unit 31 may include, but is not limited to, a mesh, a perforated structure, a platform, a filter, a filtering bed, a foam, a foam block, any combination thereof, and any other suitable device, etc. Additionally, the scale catching bed 35 may comprise a scale catching material, including, but not limited to, a material with a high surface area, granulate material, pallet material, material having pores of difference sizes, material that can have activity, including, but not limited to, polymerization reactions, etc. Further, the at least one scale catching module 10 may comprise a shape, including, but not limited to, cylindrical shape, circular shape, square and/or rectangular shape, hexagonal shape, etc.

Operating Principle:

In existing reactors, including gas liquid systems, as can be seen in FIG. 13 to FIG. 16, the EFSC of the present invention maintains low pressure drop over the scale catching module 10 to allow the gas/air of the incoming fluid to pass through the module 10 without passing through the scale catching beds 35. At the same time, the EFSC catches the undesired scale of the liquid of the incoming fluid to achieve maximum filtration since the majority of the particles in the incoming fluids are contained in the liquid phase.

Figure 13:
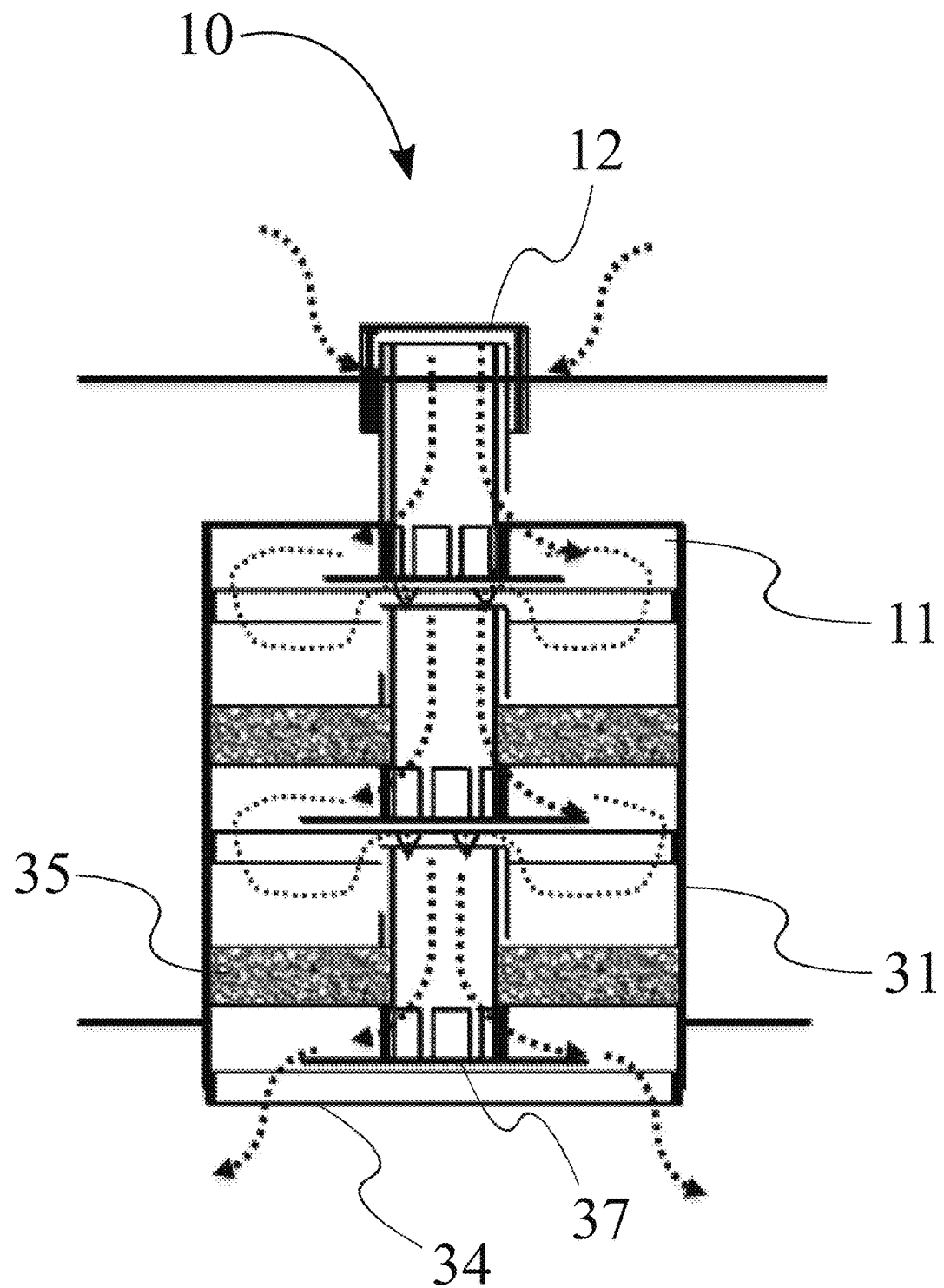
FIG. 13 is an illustration of the present invention, wherein a gas flows through the scale catching module bypassing the scale catching beds interiorly installed thereof.

As can be seen in FIG. 13, the gas/air path is achieved so that the gas/air can bypass the scale catching beds 35 with minimal pressure drop development. More specifically, when the incoming fluid level reaches the inlet port 25 of the inlet tube 13 of the cap 11, the fluid flows through the inlet tube 13. At the exit of the inlet tube 13, the fluid (gas/air and liquid) collides with the inlet plate 19. The liquid of the fluid is then splashed toward the interior perimeter of the unit body 32 of the scale catching unit 31 and falls on the scale catching bed 35. The gas of the fluid bypasses the scale catching bed 35 and flows through the transfer tube 36 of the scale catching unit 31 toward the next scale catching unit 31. The same process repeats until the gas passes through the scale catching module 10 and flows through the unit outlet 34 of the last scale catching unit 31 toward the distribution tray 92 or catalyst bed 91 of the reactor 90.

Figure 14:
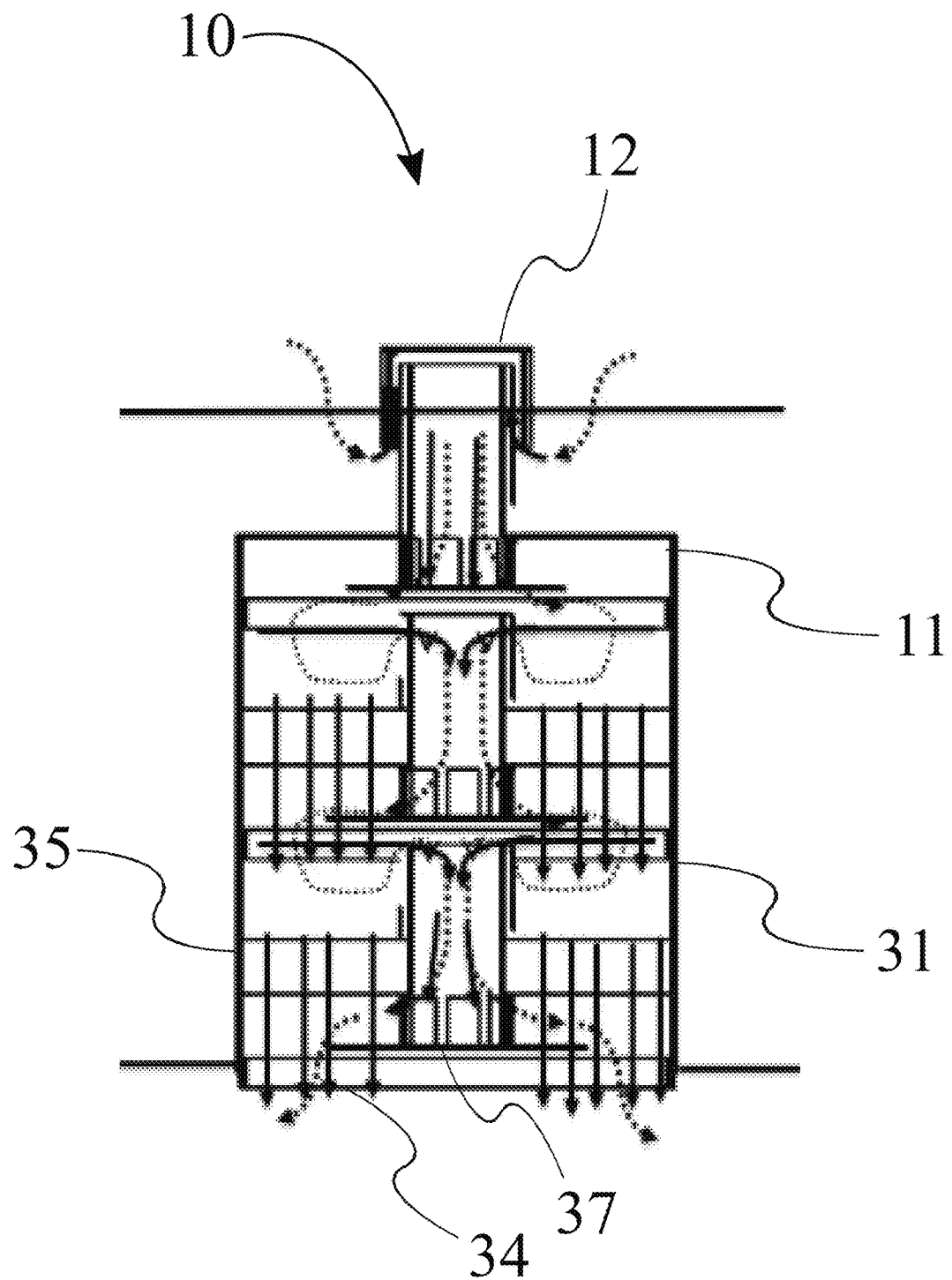
FIG. 14 is an illustration of the present invention, wherein a gas flows through the scale catching module bypassing the scale catching beds while a liquid is filtered by the passing through the scale catching beds.

As can be seen in FIG. 14, the gas of the fluid passes freely through the scale catching module 10 and prevents pressure drop from developing over the present invention. Larger particles will settle at the scale catching bed 35 and not enter the scale catching modules 10. The particles and scales from the liquid of the incoming fluid are captured by the scale catching bed 35 and particle/scales free liquid is delivered to the distribution tray 92 or catalyst bed 91 below or to the next scale catching unit 31. Gradually, more and more particles will be brought to the reactor with the incoming fluids and the scale catching bed 35 will be more saturated with the particles. Consequently, void fraction of the scale catching bed 35 will decrease and resistance to the flow through the scale catching bed 35 will increase, resulting in liquid level on the scale catching bed 35 rising proportionally to the increase of the resistance and the flow through the scale catching bed 35 will be maintained by the hydrostatic pressure of the liquid above the scale catching bed 35.

Figure 15:
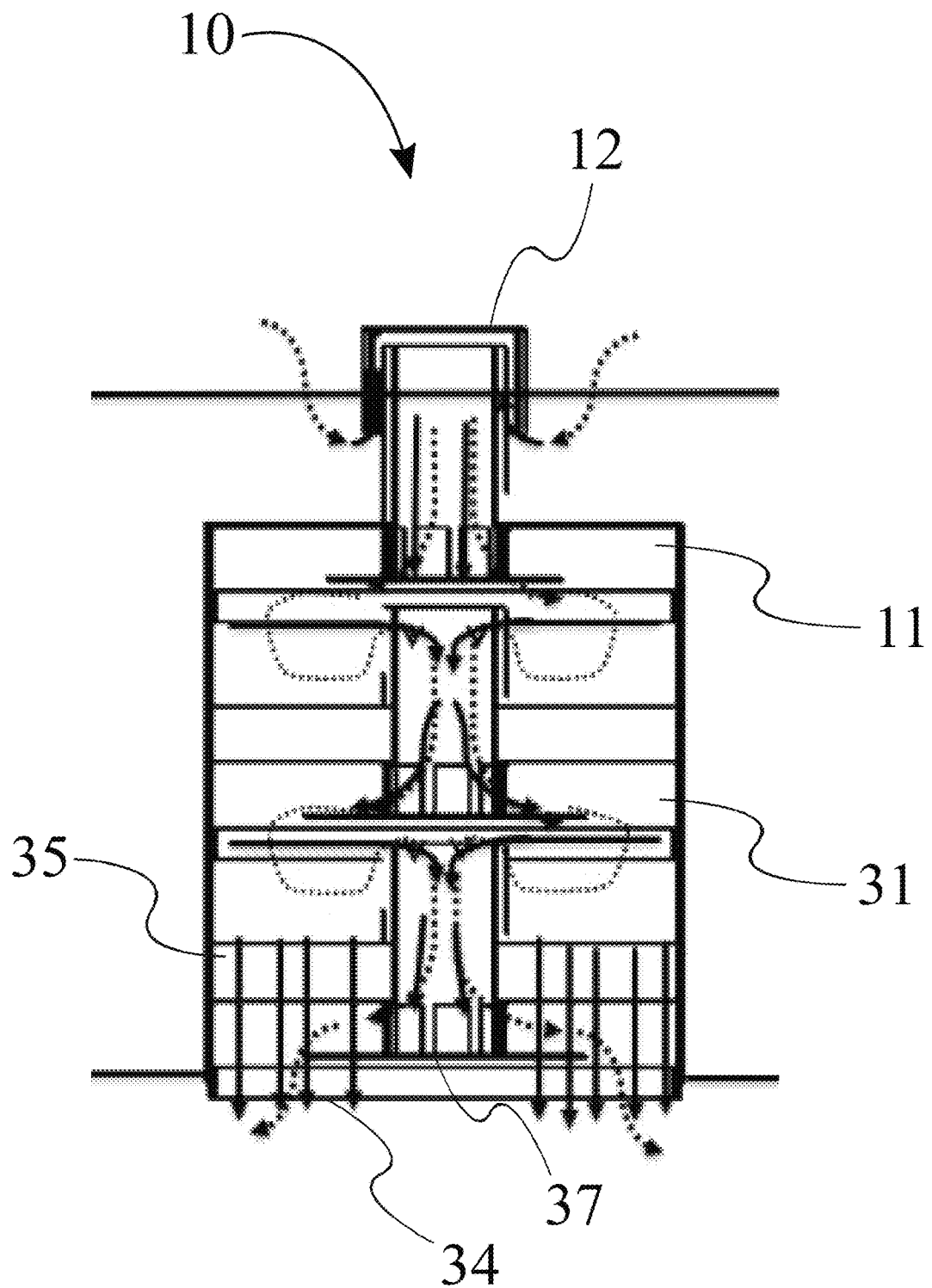
FIG. 15 is an illustration of the present invention, wherein a gas flows through the scale catching module bypassing the scale catching beds, and wherein a liquid passes through the scale catching beds while the liquid levels above the scale catching beds rise as the scale catching beds gradually get saturated.

As can be seen in FIG. 15, when saturation of the scale catching bed 35 reaches critical value the hydrostatic pressure is insufficient to "push" the liquid through the scale catching bed 35. Thus, the liquid will start to overflow through the transfer tube 36 of the scale catching unit 31 to the distributor tray 92 or the next scale catching unit 31.

Figure 16:
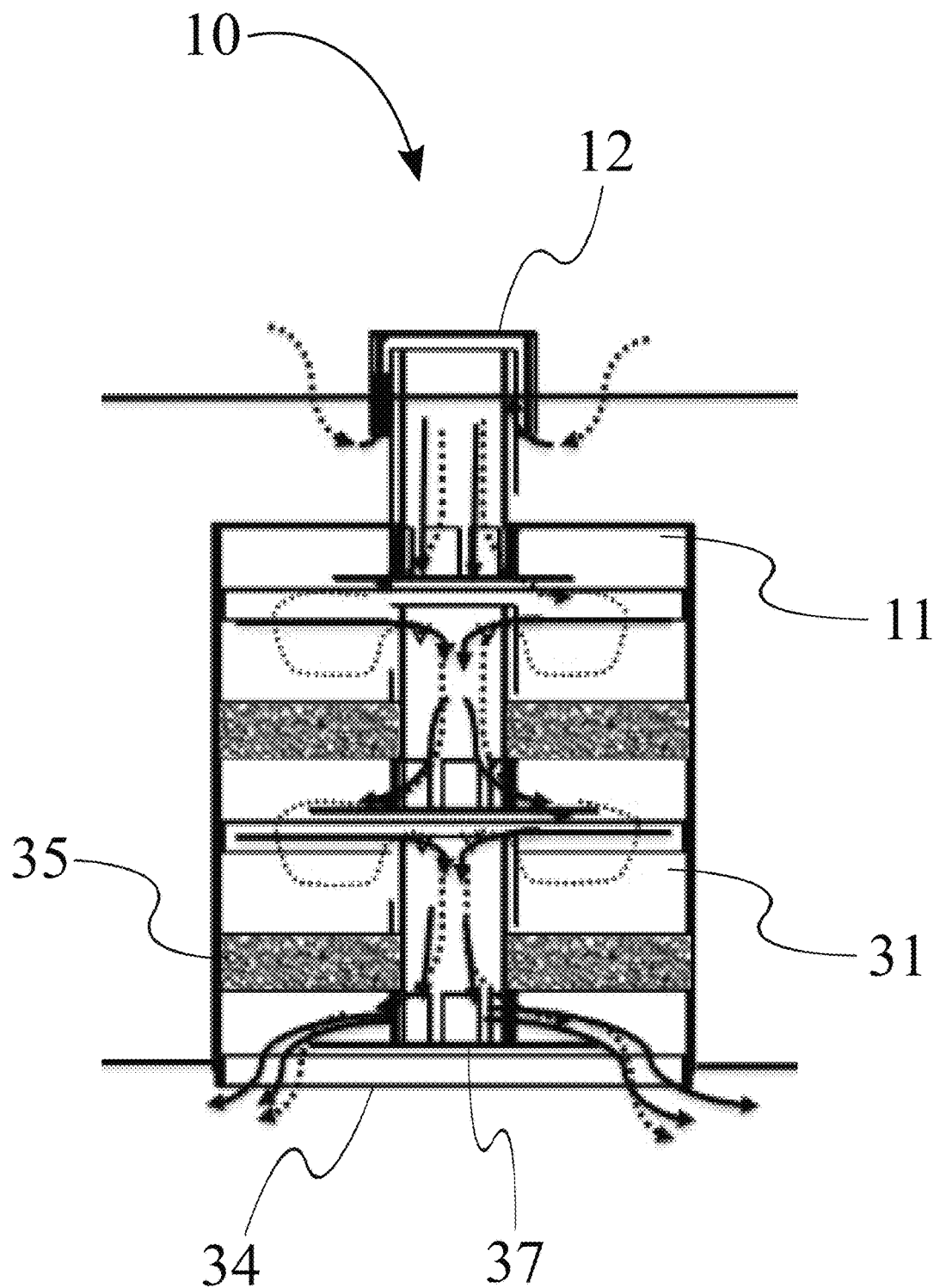
FIG. 16 is an illustration of the present invention, wherein both a gas and a liquid flow through the scale catching module bypassing the scale catching beds that are saturated.

As can be seen in FIG. 16, the process is repeated for each stacked next scale catching unit 31 until all are plugged with the scales and particles. Once the particle storing capacity of the scale catching bed 35 is reached, the process streams will simply pass through the scale catching module 10, and pressure drop will begin to develop over the reactor 90. Uneven plugging of the scale catching modules 10 will not affect the profile of the static pressure field above the liquid level at the distribution tray 92 that may be placed below the present invention. The total amount of the captured particles by the EFSC of the present invention is called EFS capacity.

The approach in which the liquid is introduced to the scale catching modules 10 from the top is assuring that all modules 10 are receiving the same amount of liquid independently on the spent capacity of the scale catching bed 35 (saturation of the scale catching beds 35). Additionally, the EFSC assures uniform delivery of the liquid to the distribution tray 92 below and maintenance of uniform static pressure filed above the liquid level on the distributor tray 92. If it is not the case and more liquid is delivered through one than other modules than radial flow of the liquid on the distributor tray 92 would influence the liquid transfer rates through different sections of the distributor tray 92. Also, different ratios of gas and liquid exiting the scale catching modules 10 and entering the space above the distribution tray 92 would cause fluctuation of the static pressure filed above the liquid. The consequence would be different liquid height around the distributor's transfer chimneys/pipes in different zones and different liquid transfer rates in those zones can cause development of radials (non-uniform temperature profile of the catalyst bed 91 at the same level (cross-section). Temperature radials can be a reason for reactor shutdown (safety reasons) and production of off spec product.

Although the invention has been explained in relation to its preferred embodiment, it is to be understood that many other possible modifications and variations can be made without departing from the spirit and scope of the invention as hereinafter claimed.

What is claimed is:

1. A modular scale catcher for providing equal flow of filtered fluids to a catalyst bed inside a reactor comprising:
    at least one scale catching module;
    a base plate;
    each scale catching module comprising a cap and at least one scale catching unit;
    the cap comprising a body, a cover, an inlet tube, an inlet gap, and an opening;
    the inlet tube being positioned on the body opposite the opening;
    the cover being exteriorly attached to the inlet tube opposite the opening;
    the inlet gap being positioned between the cover and the inlet tube;
    the scale catching unit comprising a unit inlet, a unit outlet, a unit body, and a scale catching bed;
    the unit inlet being terminally positioned on the unit body;
    the unit outlet being terminally positioned on the unit body opposite the unit inlet;
    the scale catching bed being interiorly and peripherally attached to the unit body;
    the cap being attached to the scale catching unit through the opening of the cap being adapted to the unit inlet of the scale catching unit;
    the base plate comprising at least one hole;
    each scale catching module being attached to the base plate with the unit outlet of the scale catching unit being mounted to the corresponding hole of the base plate; and
    the base plate being detachably and interiorly mounted to the reactor with the base plate being parallel with and adjacent the catalyst bed.

2. The modular scale catcher for providing equal flow of fluids to a catalyst bed inside a reactor as claimed in claim 1 comprising:
    the cap comprising a cap cavity, a cap wall, and a cap face;
    the cap cavity being interiorly positioned in the body;
    the cap wall being exteriorly positioned on the body;
    the cap face being positioned on the body opposite the opening; and
    the inlet tube being positioned on the cap face.

3. The modular scale catcher for providing equal flow of fluids to a catalyst bed inside a reactor as claimed in claim 2 comprising:
    the inlet tube of the cap comprising an inlet tube wall, a plurality of wall apertures, and an inlet port;
    the inlet port being terminally positioned on the inlet tube adjacent the cover; and
    the plurality of wall apertures being distally positioned on the inlet tube wall opposite the inlet port.

4. The modular scale catcher for providing equal flow of fluids to a catalyst bed inside a reactor as claimed in claim 3 comprising:
    the cap comprising an inlet plate;
    the inlet plate being terminally attached to the inlet tube adjacent the plurality of inlet wall apertures; and
    the inlet plate being positioned inside the cap cavity adjacent the opening.

5. The modular scale catcher for providing equal flow of fluids to a catalyst bed inside a reactor as claimed in claim 3 comprising:
    the cover being positioned adjacent the inlet port of the inlet tube;
    the cover comprising a plurality of cover slots; and
    the plurality of cover slots being positioned on the cover opposite the inlet port of the inlet tube.

6. The modular scale catcher for providing equal flow of fluids to a catalyst bed inside a reactor as claimed in claim 1 comprising:
    the scale catching unit comprising a transfer tube, and an impingement plate;
    the transfer tube being attached to the scale catching bed through insertion thereof;
    the impingement plate being terminally attached to the transfer tube; and
    the impingement plate being interiorly positioned in the unit body adjacent the unit outlet.

7. The modular scale catcher for providing equal flow of fluids to a catalyst bed inside a reactor as claimed in claim 6 comprising:
    the scale catching bed comprising a bed aperture;
    the bed aperture traversing through the scale catching bed; and
    the transfer tube being adapted to the bed aperture.

8. The modular scale catcher for providing equal flow of fluids to a catalyst bed inside a reactor as claimed in claim 6 comprising:
    the transfer tube comprising a transfer tube inlet, a transfer tube outlet, a transfer wall, and a plurality of wall apertures;
    the transfer tube inlet being terminally positioned on the transfer tube adjacent the unit inlet;
    the transfer outlet being terminally positioned on the transfer tube opposite the transfer tube inlet;
    the plurality of wall apertures being peripherally distributed on the transfer wall adjacent the transfer tube outlet; and
    the plurality of wall apertures being interiorly positioned in the unit body and adjacent the scale catching bed.

9. The modular scale catcher for providing equal flow of fluids to a catalyst bed inside a reactor as claimed in claim 1 comprising:
    the scale catching unit comprising a separation wall;
    the separation wall being attached to the scale catching bed;
    the separation wall comprising an inlet edge;
    the inlet edge being terminally positioned on the separation wall opposite the scale catching bed; and
    the separation wall being interiorly positioned in the unit body adjacent the unit inlet.

10. The modular scale catcher for providing equal flow of fluids to a catalyst bed inside a reactor as claimed in claim 1 comprising:
    the scale catching bed comprising a mesh.

11. The modular scale catcher for providing equal flow of fluids to a catalyst bed inside a reactor as claimed in claim 1 comprising:

the scale catching bed comprising a scale catching material with a high surface area.

12. The modular scale catcher for providing equal flow of fluids to a catalyst bed inside a reactor as claimed in claim 1 comprising:
the at least one scale catching module comprising a cylindrical shape.

13. The modular scale catcher for providing equal flow of fluids to a catalyst bed inside a reactor as claimed in claim 1 comprising:
the at least one scale catching module comprising a hexagonal shape.

14. The modular scale catcher for providing equal flow of fluids to a catalyst bed inside a reactor as claimed in claim 1 comprising:
the reactor comprising a distribution tray; and
the base plate being detachably and interiorly mounted to the reactor with the base plate being parallel with and adjacent the distribution tray.

15. A modular scale catcher for providing equal flow of filtered fluids to a catalyst bed inside a reactor comprising:
at least one scale catching module;
a base plate;
each scale catching module comprising a cap and at least one scale catching unit;
the cap comprising a body, a cover, an inlet tube, an inlet gap, an opening, a cap cavity, a cap wall, and a cap face;
the inlet tube being positioned on the body opposite the opening;
the cover being exteriorly attached to the inlet tube opposite the opening;
the inlet gap being positioned between the cover and the inlet tube;
the cap cavity being interiorly positioned in the body;
the cap wall being exteriorly positioned on the body;
the cap face being positioned on the body opposite the opening;
the inlet tube being positioned on the cap face;
the scale catching unit comprising a unit inlet, a unit outlet, a unit body, a scale catching bed, a transfer tube, and an impingement plate;
the unit inlet being terminally positioned on the unit body;
the unit outlet being terminally positioned on the unit body opposite the unit inlet;
the scale catching bed being interiorly and peripherally attached to the unit body;
the transfer tube being attached to the scale catching bed through insertion thereof;
the impingement plate being terminally attached to the transfer tube;
the impingement plate being interiorly positioned in the unit body adjacent the unit outlet;
the cap being attached to the scale catching unit through the opening of the cap being adapted to the unit inlet of the scale catching unit;
the base plate comprising at least one hole;
each scale catching module being attached to the base plate with the unit outlet of the scale catching unit being mounted to the corresponding hole of the base plate; and
the base plate being detachably and interiorly mounted to the reactor with the base plate being parallel with and adjacent the catalyst bed.

16. The modular scale catcher for providing equal flow of fluids to a catalyst bed inside a reactor as claimed in claim 15 comprising:
the inlet tube of the cap comprising an inlet tube wall, a plurality of wall apertures, and an inlet port;
the inlet port being terminally positioned on the inlet tube adjacent the cover;
the plurality of wall apertures being distally positioned on the inlet tube wall opposite the inlet port;
the cap comprising an inlet plate;
the inlet plate being terminally attached to the inlet tube adjacent the plurality of inlet wall apertures; and
the inlet plate being positioned inside the cap cavity adjacent the opening.

17. The modular scale catcher for providing equal flow of fluids to a catalyst bed inside a reactor as claimed in claim 16 comprising:
the cover being positioned adjacent the inlet port of the inlet tube;
the cover comprising a plurality of cover slots; and
the plurality of cover slots being positioned on the cover opposite the inlet port of the inlet tube.

18. The modular scale catcher for providing equal flow of fluids to a catalyst bed inside a reactor as claimed in claim 15 comprising:
the scale catching bed comprising a bed aperture;
the bed aperture traversing through the scale catching bed;
the transfer tube being adapted to the bed aperture;
the transfer tube comprising a transfer tube inlet, a transfer tube outlet, a transfer wall, and a plurality of wall apertures;
the transfer tube inlet being terminally positioned on the transfer tube adjacent the unit inlet;
the transfer outlet being terminally positioned on the transfer tube opposite the transfer tube inlet;
the plurality of wall apertures being peripherally distributed on the transfer wall adjacent the transfer tube outlet; and
the plurality of wall apertures being interiorly positioned in the unit body and adjacent the scale catching bed.

19. The modular scale catcher for providing equal flow of fluids to a catalyst bed inside a reactor as claimed in claim 15 comprising:
the scale catching unit comprising a separation wall;
the separation wall being attached to the scale catching bed;
the separation wall comprising an inlet edge;
the inlet edge being terminally positioned on the separation wall opposite the scale catching bed; and
the separation wall being interiorly positioned in the unit body adjacent the unit inlet.

20. A modular scale catcher for providing equal flow of filtered fluids to a catalyst bed inside a reactor comprising:
at least one scale catching module;
a base plate;
each scale catching module comprising a cap and at least one scale catching unit;
the cap comprising a body, a cover, an inlet tube, an inlet gap, an opening, a cap cavity, a cap wall, a cap face, and an inlet plate;
the inlet tube being positioned on the body opposite the opening;
the cover being exteriorly attached to the inlet tube opposite the opening;
the inlet gap being positioned between the cover and the inlet tube;
the cap cavity being interiorly positioned in the body;
the cap wall being exteriorly positioned on the body;
the cap face being positioned on the body opposite the opening;

the inlet tube being positioned on the cap face;

the inlet tube of the cap comprising an inlet tube wall, a plurality of wall apertures, and an inlet port;

the inlet port being terminally positioned on the inlet tube adjacent the cover;

the plurality of wall apertures being distally positioned on the inlet tube wall opposite the inlet port;

the inlet plate being terminally attached to the inlet tube adjacent the plurality of inlet wall apertures;

the inlet plate being positioned inside the cap cavity adjacent the opening;

the cover being positioned adjacent the inlet port of the inlet tube;

the cover comprising a plurality of cover slots;

the plurality of cover slots being positioned on the cover opposite the inlet port of the inlet tube;

the scale catching unit comprising a unit inlet, a unit outlet, a unit body, a scale catching bed, a transfer tube, and an impingement plate;

the unit inlet being terminally positioned on the unit body;

the unit outlet being terminally positioned on the unit body opposite the unit inlet;

the scale catching bed being interiorly and peripherally attached to the unit body;

the transfer tube being attached to the scale catching bed through insertion thereof;

the impingement plate being terminally attached to the transfer tube;

the impingement plate being interiorly positioned in the unit body adjacent the unit outlet;

the transfer tube comprising a transfer tube inlet, a transfer tube outlet, a transfer wall, and a plurality of wall apertures;

the transfer tube inlet being terminally positioned on the transfer tube adjacent the unit inlet;

the transfer outlet being terminally positioned on the transfer tube opposite the transfer tube inlet;

the plurality of wall apertures being peripherally distributed on the transfer wall adjacent the transfer tube outlet;

the plurality of wall apertures being interiorly positioned in the unit body and adjacent the scale catching bed;

the cap being attached to the scale catching unit through the opening of the cap being adapted to the unit inlet of the scale catching unit;

the base plate comprising at least one hole;

each scale catching module being attached to the base plate with the unit outlet of the scale catching unit being mounted to the corresponding hole of the base plate; and the base plate being detachably and interiorly mounted to the reactor with the base plate being parallel with and adjacent the catalyst bed.

* * * * *